(12) United States Patent
Tibbitts et al.

(10) Patent No.: US 8,210,208 B2
(45) Date of Patent: Jul. 3, 2012

(54) ELECTRICALLY OPERATED HYDRAULIC VALVE

(75) Inventors: Matthew H Tibbitts, Windsor (GB);
Andrew D Gledhill, Stonehaven (GB);
David S Innes, Inverurie (GB)

(73) Assignee: Aker Subsea Limited, Maidenhead, Berkshire (GB)

( * ) Notice: Subject to any disclaimer, the term of this patent is extended or adjusted under 35 U.S.C. 154(b) by 637 days.

(21) Appl. No.: 12/304,821

(22) PCT Filed: May 3, 2007

(86) PCT No.: PCT/GB2007/001634
§ 371 (c)(1),
(2), (4) Date: Aug. 5, 2009

(87) PCT Pub. No.: WO2007/138244
PCT Pub. Date: Dec. 6, 2007

(65) Prior Publication Data
US 2010/0065766 A1    Mar. 18, 2010

(30) Foreign Application Priority Data
Jun. 1, 2006   (GB) .................................. 0610813.8

(51) Int. Cl.
*F15B 13/044* (2006.01)
*F15B 13/04* (2006.01)
(52) U.S. Cl. .......... 137/625.69; 137/625.65; 137/625.67
(58) Field of Classification Search ............. 137/625.25, 137/625.27, 625.65, 625.67, 625.69
See application file for complete search history.

(56) References Cited

U.S. PATENT DOCUMENTS

| 2,293,906 | A |   | 8/1942 | Kvavle et al. |   |
| 2,471,285 | A |   | 5/1949 | Rice |   |
| 3,401,711 | A | * | 9/1968 | Kubilos | 137/625.61 |
| 3,527,253 | A | * | 9/1970 | Harpman | 137/625.27 |

(Continued)

FOREIGN PATENT DOCUMENTS

DE     20 56 989       6/1972

(Continued)

OTHER PUBLICATIONS

International Search Report for PCT/GB2007/001634, mailed Sep. 18, 2007.

(Continued)

*Primary Examiner* — John Rivell
(74) *Attorney, Agent, or Firm* — Nixon & Vanderhye PC

(57) ABSTRACT

An electrically operated hydraulic valve comprises a valve assembly that provides a common valve passageway, an inlet port, an outlet port and a return port connected to the passageway and an axially movable valve device which allows in a first position fluid flow between the outlet port and the return port while closing the inlet and in a second position, axially displaced from the first position, fluid flow between the inlet port and the outlet port while closing the return port. A spring provides a restoring force urging the valve device to its first position. An electrically operated actuator coupled to the valve device comprises a permanent magnet and a cooperating electrical coil having an associated magnetic core, one or other of the magnet and the coil constituting a stator and the other constituting an armature which is coupled to the valve device to move it from the first position to the second position. The actuator is disposed for operation by an electrical supply which provides a unidirectional current pulse to the coil.

5 Claims, 2 Drawing Sheets

U.S. PATENT DOCUMENTS

| | | | | |
|---|---|---|---|---|
| 3,807,441 | A * | 4/1974 | Grosseau | 137/625.65 |
| 3,996,965 | A * | 12/1976 | Peters | 137/625.66 |
| 4,193,421 | A * | 3/1980 | Sakakibara et al. | 137/625.33 |
| 4,210,065 | A | 7/1980 | Switzer | |
| 4,217,934 | A * | 8/1980 | Peters | 137/625.69 |
| 4,641,693 | A * | 2/1987 | Rakucewicz | 137/625.27 |
| 4,643,228 | A | 2/1987 | Spencer | |
| 4,664,152 | A | 5/1987 | O'Mara | |
| 4,711,269 | A * | 12/1987 | Sule | 137/625.65 |
| 4,722,362 | A * | 2/1988 | Muschong et al. | 137/596.16 |
| 5,325,891 | A | 7/1994 | Mateja | |
| 6,427,970 | B1 * | 8/2002 | Silva | 251/129.01 |
| 6,871,668 | B2 * | 3/2005 | Moreno et al. | 137/625.27 |
| 2002/0029813 | A1 * | 3/2002 | Suto et al. | 137/625.69 |

FOREIGN PATENT DOCUMENTS

| | | |
|---|---|---|
| DE | 38 33 079 | 4/1990 |
| DE | 203 18 992 | 4/2005 |
| EP | 0 349 723 | 1/1990 |
| EP | 0 785 558 | 7/1997 |
| GB | 2 039 150 | 7/1980 |
| GB | 2 186 349 A | 8/1987 |
| GB | 2 240 158 A | 7/1991 |
| GB | 2 344 405 | 6/2000 |
| GB | 2 369 874 A | 6/2002 |
| JP | 59-80576 | 5/1984 |
| WO | 2006/006873 | 1/2006 |

OTHER PUBLICATIONS

International Search Report dated Oct. 17, 2007, re PCT/GB2007/002724.

International Searching Authority Written Opinion dated Oct. 17, 2007, re PCT/GB2007/002724.

UK Search Report dated Oct. 26, 2006, re GB Application No. 0614989.2.

* cited by examiner

ELECTRICALLY OPERATED HYDRAULIC VALVE

This application is the U.S. national phase of International Application No. PCT/GB2007/001634, filed 3 May 2007, which designated the U.S. and claims priority to Great Britian Application No. 0610813.8, filed 1 Jun. 2006, the entire contents of each of which are hereby incorporated by reference.

FIELD OF THE INVENTION

This invention relates to electrically operated hydraulic valves and particularly to such valves as may be used in systems for the extraction of fluid hydro-carbons from subsea locations.

BACKGROUND TO THE INVENTION

There are two principal difficulties in achieving an acceptable design of an electrically operated valve for use in the foregoing circumstances. One is the limited availability of electrical power. Another is the likelihood that the hydraulic fluid will be contaminated with particles.

The general object of the invention is to provide a low-power valve which can tolerate use with hydraulic fluid that may be contaminated with particles having a maximum particle size greater than 100 microns.

SUMMARY

The present exemplary embodiment provides an electrically operated hydraulic valve comprising a valve assembly that provides a common passageway, an inlet port, an outlet port and a return port connected to the passageway and an axially movable valve device which allows in a first position fluid flow between the outlet port and the return port while closing the inlet and in a second position, axially displaced from the first position, fluid flow between the inlet port and the outlet port while closing the return port. A means providing a restoring force urges the valve device to its first position; and an electrically operated actuator which is coupled to the valve device comprises a permanent magnet and a cooperating electrical coil having an associated magnetic core. One or other of the magnet and the coil constitutes a stator and the other constitutes an armature which is coupled to the valve device to move it from the first position to the second position. The actuator is disposed for operation by an electrical supply which provides a unidirectional current pulse to the coil.

In some embodiments of the invention the valve device comprises two opposed poppets engageable with respective valve seats one at each end of the said valve passageway, the inlet port and the return port being in communication according to the position of the valve device with respective ends of the valve passageway and the outlet port being in communication with the valve passageway at a location intermediate the ends thereof. Each poppet may comprise a head for engaging the respective seat and a nose which extends within the valve passageway to the nose of the other poppet.

In another embodiment of the invention the valve device comprises a valve spool having a lateral valve chamber and the said ports intersect the valve passageway at locations spaced apart along the passageway. The outlet port may intersect the valve passage at a location between and substantially equidistant from the locations where the return port and the inlet port intersect the valve passageway.

In this embodiment, the valve chamber may have end surfaces of different effective area whereby fluid pressure in the valve chamber can urge the valve device towards the first position. The valve passageway may be a blind bore and the valve device may have an internal relief passage extending between its ends.

In any of these embodiments the permanent magnet is preferably a cylindrical magnet and the permanent magnet, the coil and a cylindrical magnetic core are coaxially arranged. The coil and the permanent magnet may both be disposed within an annular space between outer and inner parts of the magnetic core.

DETAILED DESCRIPTION

Figure 1:
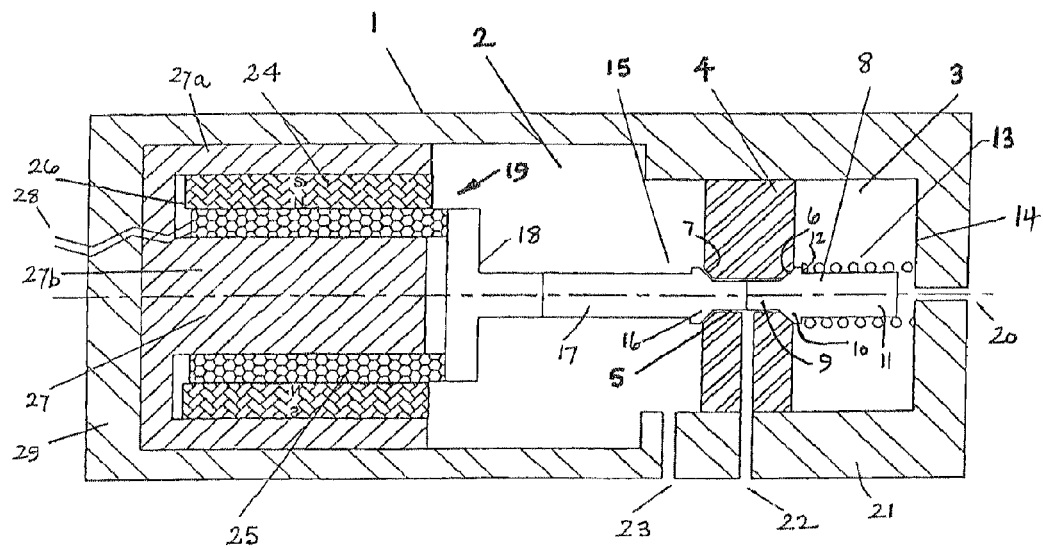
FIG. 1 illustrates sectionally and partly schematically one embodiment of a valve according to the invention.

FIG. 1 illustrates a first embodiment of the invention. The illustrated valve is contained within a generally cylindrical housing 1 of which the interior constitutes a main chamber 2, which has an interior step defining a well 3 at the right-hand end of the chamber. The interior of the well is partitioned from the chamber 2 by a bulkhead 4. For the sake of convenience, the right-hand end of the housing and parts associated therewith are termed 'lower' in this description and the left-hand end and parts associated therewith are termed 'upper'. This nomenclature is employed because it is customary, though not essential, for the valve actuator to be disposed in a subsea module with its central axis disposed upright.

The bulkhead 4 defines a passageway 5 between two valve seats, in this embodiment frustoconical valve seats 6 and 7 disposed at the lower end and at the upper end respectively of the passageway 5. Extending into the passageway 5 from the lower end is a 'lower' poppet 8. This poppet has a nose 9 that is substantially smaller than the passageway 5 so that particulate matter can be carried through the passageway. The poppet 8 has a frustoconical head 10 which can seal against the respective valve seat 6, and a short rear shank 11. To the rear of the head is an annular shoulder 12 against which bears one end of a return spring 13, which is carried on the shank 11. The other, lower, end of this return spring end bears against a datum provided by the lower end wall 14 of the housing 1. This return spring is a means of providing a bias to keep the valve 8 normally closed.

Opposing the lower poppet is an 'upper' poppet 15 which is generally similar to the valve 8. Its nose extends into the passageway 5 between the valve seats 6 and 7 and into abutment with the nose of the valve 8. By virtue of the spring 13, the two poppets can move in unison and constitute, in effect, a single elongate axially movable valve device. The upper poppet 15 has a head 16 which can make sealing engagement with the upper seat 7 and the upper poppet has a shank 17 extending axially into engagement with a yoke 18 which forms part of an armature of a linear electromagnetic actuator, denoted generally by the numeral 19.

Extending into the well 3 through the lower wall 14 is a passageway 20 constituting a fluid inlet port. This port is connected by any convenient means to a source of hydraulic fluid under pressure. Extending into the passageway 5 between the valve seats 6 and 7 and in particular, through the side wall 21 of the valve housing 1 and through the bulkhead 4 is a passageway 22 constituting a fluid outlet port, or 'function' port. This passageway 22 is generally aligned with the location where the noses of the poppets 8 and 15 engage each other. Extending into the main chamber 2 and, in particular, through the side wall 21 of the housing is a passageway 23 constituting a fluid return port or 'vent' port.

From the description thus far it may be understood that the inlet port 20 is effectively closed by the lower poppet 8 and that when this poppet is closed the upper poppet 15 is lifted from its seat 7 to provide communication between the fluid outlet port 22 and the fluid return port 23. Conversely, if the upper poppet 15 is urged against its valve seat 7, the lower poppet 8 is lifted, against the force of the return spring 13, from its seat 6.

The size of the passageway 5 relative to the noses of the poppets can be made large enough to allow the passage of particulate contaminants in the hydraulic fluid controlled by the valve. In particular, it can allow the passage of particles up to at least 100 microns.

At the upper end of the chamber 2 is the actuator 19 aforementioned. In this embodiment, it is constituted by a permanent magnet stator 24 and a moving coil armature 25 coaxial therewith. The permanent magnet 24 is a cylindrical magnet disposed in an annular aperture 26 of a cylindrical E-section magnetic core 27 which has a cylindrical outer part 27a and a central solid cylindrical part 27b. In an annular space between the central cylindrical part 27b of the magnetic core and the permanent magnet 24 is the moving coil armature 25 composed of an electrical coil to which there are electrical connections 28 extending through the upper end wall 29 of the housing 1. The moving coil and its former (not explicitly shown) are fixed to the yoke 18.

The moving coil armature 25 may be energized by a short duration direct current pulse so as to move the yoke 18 and thereby the shank 17 of the upper poppet 15 in the downward (rightwards) direction against the force of the restoring bias provided by the return spring 13.

The movement required to lift the lower poppet 8 from its seat 6 is determined by the difference in the distances between the valve seats and the poppets when the poppets abut each other; it can be made just sufficient to allow the passage of particles of a predetermined maximum size, generally greater than 100 microns. Accordingly, the electrical supply may be a simple direct current, low power supply which does not require any complex electronic switching circuit.

In a 'rest' phase of the valve, the return spring 13 urges the lower poppet 8 against the respective valve seat, closing the outlet port 22 off from the inlet port 20 but allowing venting from the outlet port 22 to the return port 23.

Energization of the moving coil actuator moves the upper poppet 15 against its seat, thereby opening the passage from the inlet port 20 to the outlet port 22 and closing the passage to the vent port 23.

Figure 2:
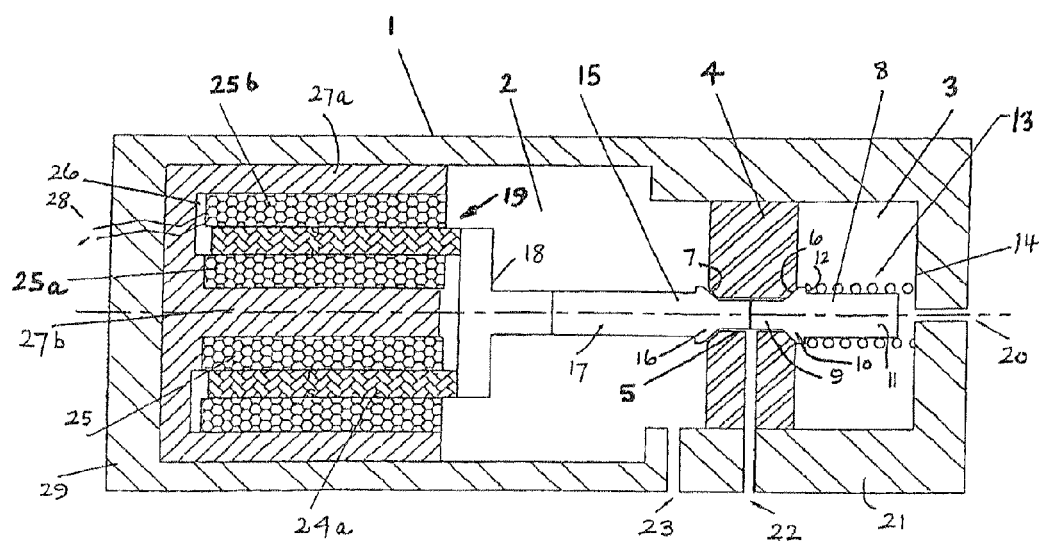
FIG. 2 illustrates a modified version of the valve shown in FIG. 1.

FIG. 2 illustrates an embodiment similar to that shown in FIG. 1. The construction of the lower end of the valve is the same as that as shown in FIG. 1 and need not therefore by described in detail. However, in this embodiment, the coil part of the actuator is the stator and the armature is constituted by a permanent magnet. In particular, the coil stator has an inner winding 25a on the central part 27a of the magnetic core 27 and an outer winding 25b adjacent the outer part of the magnetic core. The permanent magnet armature comprises a cylindrical permanent magnet 24a fixed to the yoke 18 and slidingly movable in the annular space between the outer and inner windings. Connections 28 provide direct current to the windings 25a and 25b of the coil 25.

Figure 3:
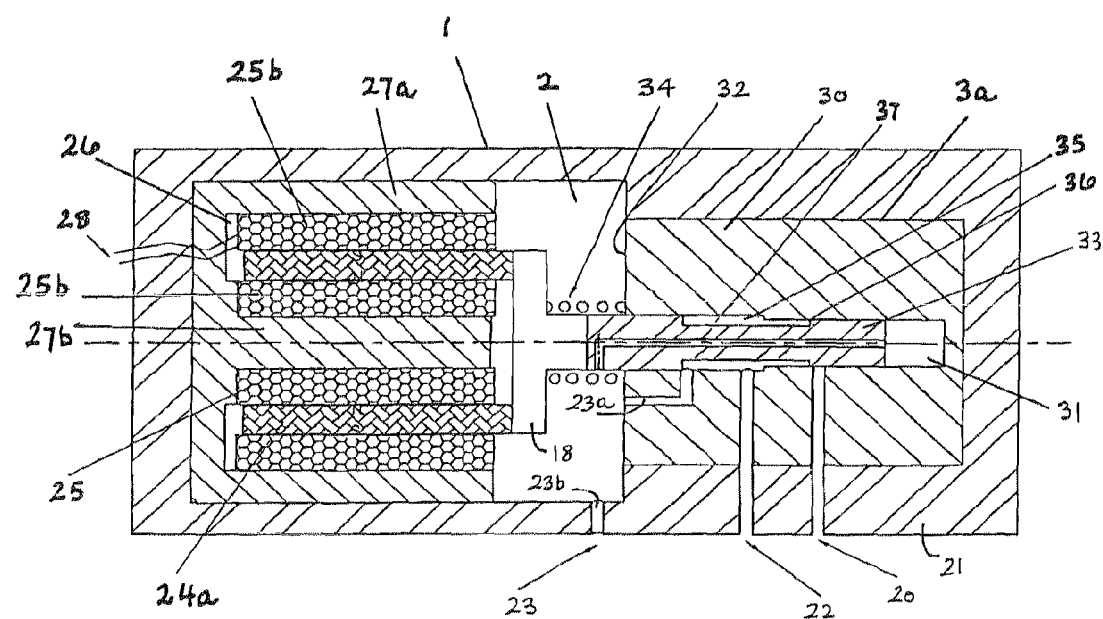
FIG. 3 illustrates another embodiment of a valve according to the invention.

FIG. 3 illustrates another embodiment of the invention. The illustrated valve is contained within a generally cylindrical housing 1 of which the interior constitutes a main chamber 2 which has an interior step defining a well 3a at the right-hand end of the chamber. In this embodiment the well is occupied by a valve block 30, which has a valve passageway 31 constituted by a blind bore extending axially from the upper end of the block almost to the lower end. Within this bore 31 is slidingly moveable a single elongate axially movable valve device, comprising a valve spool 33, which at its upper end is secured to a yoke 18. A bias urging the yoke 18 and thereby the valve spool, in the leftwards (upward) direction is provided by a return spring 34 between the yoke and the upper face 32 of the valve block 30.

Communicating with the valve passageway 31 are three ports, the fluid inlet port 20, the fluid outlet or 'function' port 22 and the fluid return or 'vent' port 23. The fluid inlet port 20 comprises a passage extending from the exterior through the side wall 21 of the housing 1 and the valve block 30. The fluid outlet port 22 comprises a passage through the side wall of the housing and the valve block. The fluid return port 23 comprises a passage 23a through the valve block 30 from the passage 31 to the chamber 2 and a passage 23b from the chamber 2 through the side wall of the housing 1.

The three ports open into the valve passageway at locations which are spaced apart along the passageway 31. The outlet port 22 where it intersects the passageway 31 is substantially equi-distant from the effective locations of the inlet port 20 and the return port 23, i.e. where these ports intersect the passageway 31.

The valve spool 33 defines a valve chamber 35 comprising an annular peripheral recess. The end shoulders of this recess are separated by a distance slightly less than the sum of the effective width of the return port 23 and the effective distance between the inlet port 20 and the return port 23.

The bore 31 is stepped at a shoulder 36, the lower end having a smaller bore than the upper end and the two ends of the valve spool are of different sizes, the lower end fitting within the smaller lower end of the bore 31 and the upper end fitting within the larger upper end of the bore 31. The valve spool 33 also has a relief passage 37 extending from the chamber 2 along and inside the valve spool 33 to the lower end thereof.

The valve spool is moveable against the force of the return spring 34 from the position shown in FIG. 3 of the drawings towards the lower end of the housing. In the position shown the outlet port 22 is connected to the return port 23 by the valve chamber 35 and the inlet port 20 is closed. Movement of the valve spool 33 brings the spool to an intermediate position wherein the inlet port 20 is opened; then further movement of the valve spool allows full connection of the inlet port 20 to the outlet port 22 and closure of the return port 23. The necessary stroke for the valve spool is approximately the effective width (in the axial direction) of the return port 23.

The relief passage 37 prevents any fluid or vacuum lock. Also, by virtue of, in this embodiment, a difference in the effective areas of the two ends of the valve chamber 35, fluid pressure in the chamber 35 will tend to drive the valve spool 33 to a fail-safe position in which there can always be exhaust from the return port 23.

This embodiment of the invention, like those previously described, is adapted to accommodate the use of hydraulic fluid which may be contaminated with particulate matter. The valve can readily accommodate particles having a particle size greater than 100 microns.

The valve spool 33 can be moved by an electrical actuator similar to that described with reference to either of the foregoing Figures, whereby either one of a stator and an armature is constituted by a permanent magnet and the other is constituted by a coil and an associated permanent magnetic core, all these elements being coaxial. In the described embodiment, the coil is stationary and the armature is a permanent magnet. In particular, the coil stator has an inner winding 25a on the central part 27a of the magnetic core 27 and an outer winding 25b adjacent the outer part of the magnetic core. The permanent magnet armature comprises a cylindrical permanent magnet 24a fixed to the yoke 18 and slidingly movable in the annular space between the outer and inner windings. Connections 28 provide direct current, i.e. a unidirectional current pulse, to the windings 25a and 25b of the coil 25. Owing to the very short stroke required, the electrical supply may be a direct current, low power supply which does not require any complex electronic switching circuit.

The invention claimed is:

1. An electrically operated hydraulic valve comprising:
a valve assembly that provides a common valve passageway, an inlet port, an outlet port and a return port connected to the passageway, and an axially movable valve device which allows in a first position fluid flow between the outlet port and the return port while closing the inlet port and in a second position, axially displaced from the first position, fluid flow between the inlet port and the outlet port while closing the return port;
means providing a restoring force urging the valve device to its first position; and
an electrically operated actuator coupled to the valve device and comprising a permanent magnet and a cooperating electrical coil having an associated magnetic core, one or other of the magnet and the coil constituting a stator and the other constituting an armature which is coupled to the valve device to move it from the first position to the second position, and disposed for operation by an electrical supply which provides a unidirectional current pulse to the coil;
wherein the valve device comprises a valve spool having a lateral valve chamber and the ports intersect the valve passageway at locations spaced apart along the passageway, and
wherein the valve passageway is a blind bore and the valve device has an internal relief passage extending between its ends.

2. A valve according to claim 1, in which the outlet port intersects the valve passageway at a location between and substantially equidistant from the locations where the return port and the inlet port intersect the valve passageway.

3. A valve according to claim 1, in which the valve chamber has end surfaces of different effective area whereby fluid pressure in the valve chamber can urge the valve device towards the first position.

4. A valve according to claim 1, in which the permanent magnet is a cylindrical magnet and the permanent magnet, the coil and a cylindrical magnetic core are coaxially arranged.

5. A valve according to claim 1, in which the coil and the permanent magnet are both disposed within an annular space between outer and inner parts of the magnetic core.

* * * * *